US011475609B2

(12) United States Patent
Yasukawa

(10) Patent No.: US 11,475,609 B2
(45) Date of Patent: Oct. 18, 2022

(54) COMPUTER PROGRAM, SERVER DEVICE, TERMINAL DEVICE, AND METHOD FOR MOVING GIFT IN VIRTUAL SPACE

(71) Applicant: GREE, INC., Tokyo (JP)

(72) Inventor: Takashi Yasukawa, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/159,640

(22) Filed: Jan. 27, 2021

(65) Prior Publication Data

US 2021/0233286 A1 Jul. 29, 2021

(30) Foreign Application Priority Data

Jan. 29, 2020 (JP) .............................. JP2020-012764

(51) Int. Cl.
*G06T 11/00* (2006.01)
*G06T 3/40* (2006.01)
*G06T 3/20* (2006.01)
*G06T 7/70* (2017.01)

(52) U.S. Cl.
CPC ............... *G06T 11/00* (2013.01); *G06T 3/20* (2013.01); *G06T 3/40* (2013.01); *G06T 7/70* (2017.01)

(58) Field of Classification Search
CPC ... G06T 11/00; G06T 3/20; G06T 3/40; G06T 7/70; G06T 19/20; G06T 2219/2004; G06T 2219/2016
See application file for complete search history.

(56) References Cited

U.S. PATENT DOCUMENTS

| 8,576,235 B1* | 11/2013 | Sumner | A63F 13/5258 |
| | | | 345/473 |
| 2009/0058856 A1* | 3/2009 | Kuroda | A63F 13/10 |
| | | | 345/427 |
| 2016/0366396 A1* | 12/2016 | Kim | G06T 13/20 |
| 2019/0005736 A1* | 1/2019 | Danieau | G06T 15/20 |
| 2019/0070505 A1 | 3/2019 | Ratelle et al. | |
| 2019/0349625 A1 | 11/2019 | Watanabe et al. | |

FOREIGN PATENT DOCUMENTS

| JP | H09-050541 A | 2/1997 |
| JP | H09-299613 A | 11/1997 |
| JP | 2009-59111 A | 3/2009 |

(Continued)

OTHER PUBLICATIONS

Jun. 16, 2020 Office Action issued in Japanese Patent Application No. 2020-012764.

(Continued)

*Primary Examiner* — Michael Le
(74) *Attorney, Agent, or Firm* — Oliff PLC

(57) ABSTRACT

A computer program is executed by a processor to move a position of at least one gift by a transparent object in a virtual space between a subject and a camera that images the subject, and move the position of the gift to increase a display area of the subject imaged by the camera. The processor is programmed to (i) acquire information related to the position of a subject in a virtual space, (ii) acquire information related to the position of a camera that images the subject, and (iii) generate a transparent object in the virtual space between the subject and the camera.

16 Claims, 9 Drawing Sheets

(56) References Cited

FOREIGN PATENT DOCUMENTS

| JP | 2009059111 A | * | 3/2009 | ............. A63F 13/10 |
|----|--------------|---|--------|--------------------------|
| JP | 2018-5005 A  |   | 1/2018 |                          |
| JP | 2018005005 A | * | 1/2018 | ............... G06F 3/01 |
| JP | 6382468 B1   | * | 8/2018 |                          |
| JP | 2019-046430 A |  | 3/2019 |                          |
| JP | 2019-197292 A |  | 11/2019 |                         |
| JP | 2019-198060 A |  | 11/2019 |                         |
| JP | 2019197292 A | * | 11/2019 |                         |

OTHER PUBLICATIONS

Oct. 6, 2020 Office Action issued in Japanese Patent Application No. 2020-012764.
Aug. 23, 2022 Office Action issued in Japanese Patent Application No. 2021-000508.

* cited by examiner

| AN EXAMPLE OF INFORMATION THAT CAN BE ACQUIRED BY ACQUISITION PORTION |
|---|
| INFORMATION RELATED TO SUBJECT 1 |
| INFORMATION RELATED TO SUBJECT 2 |
| ... |
| INFORMATION RELATED TO GIFT 1 |
| INFORMATION RELATED TO GIFT 2 |
| ... |
| INFORMATION RELATED TO CAMERA 1 |
| INFORMATION RELATED TO CAMERA 2 |
| ... |

FIG. 4

| AN EXAMPLE OF INFORMATION THAT CAN BE ACQUIRED BY ACQUISITION PORTION |
|---|
| INFORMATION RELATED TO SUBJECT 1 |
| INFORMATION RELATED TO SUBJECT 2 |
| ... |
| INFORMATION RELATED TO GIFT 1 |
| INFORMATION RELATED TO GIFT 2 |
| ... |
| INFORMATION RELATED TO CAMERA 1 |
| INFORMATION RELATED TO CAMERA 2 |
| ... |
| SHAPE INFORMATION RELATED TO OBJECT |
| SIZE INFORMATION RELATED TO OBJECT |
| OBJECT GENERATION INSTRUCTION INFORMATION |

FIG. 5

COMPUTER PROGRAM, SERVER DEVICE, TERMINAL DEVICE, AND METHOD FOR MOVING GIFT IN VIRTUAL SPACE

This application claims the benefit of priority from Japanese Patent Application No. 2020-012764 filed Jan. 29, 2020, the entire content of the prior application being incorporated herein by reference.

TECHNICAL FIELD

Technologies disclosed in this application relate to a computer program, a server device, a terminal device, and a method.

BACKGROUND

In recent years, there have been games, animations, videos, and the like that provide a virtual space in which a subject appears. In their world, the subject may become difficult to recognize because of an object in the virtual space, due to a positional relationship between the object and the subject.

PRIOR ART TECHNOLOGY REFERENCES

Patent References

Patent Document 1 JP H09-299613A
Patent Document 2 JP H09-50541A

SUMMARY

Both of the technologies described in the above-mentioned Patent Documents 1 and 2 make an object translucent when it is difficult to recognize the subject from the camera due to the object being between the subject and the camera.

The above-mentioned Patent Documents 1 and 2 are incorporated herein by reference in their entirety.

Some embodiments disclosed in this application provide a computer program, a server device, a terminal device, and a method that make it easier to recognize a subject even if there is an object between the subject and the camera.

The computer program according to an embodiment is executed by a processor, whereby (i) a position of at least one gift is moved by a transparent object in the virtual space between the subject and a camera that images the subject, and (ii) due to the position of the gift being moved, a display area of the subject imaged by the camera is increased.

Further, the computer program according to another embodiment is executed by a processor to (i) acquire information related to a position of a subject in a virtual space, (ii) acquire information related to a position of a camera that images the subject, and (iii) generate a transparent object in the virtual space between the subject and the camera.

Additionally, the computer program according to another embodiment is executed by a processor to (i) acquire information related to a transparent object generated in a virtual space between a subject and a camera and (ii) set the transparent object, using the information related to the transparent object.

The server device according to an embodiment comprises a processor. The processor executes a computer-readable command to (i) move a position of at least one gift by a transparent object in a virtual space between a subject and a camera that images the subject and (ii) due to the position of the gift being moved, increase a display area of the subject imaged by the camera.

Further, the server device according to another embodiment comprises a processor. The processor executes a computer-readable command to (i) acquire information related to a position of a subject in a virtual space, (ii) acquire information related to a position of a camera that images the subject, and (iii) generate a transparent object in the virtual space between the subject and the camera.

In addition, the method according to an embodiment is a method executed by a processor that executes a computer-readable command. The processor executes the command to (i) move the position of at least one gift by a transparent object in a virtual space between a subject and a camera that images the subject and (ii) due to the position of the gift being moved, increase a display area of the subject imaged by the camera.

Further, the method according to another embodiment is a method executed by a processor that executes a computer-readable command. The processor executes the command to (i) acquire information related to a position of a subject in a virtual space, (ii) acquire information related to a position of a camera that images the subject, and (iii) generate a transparent object in the virtual space between the subject and the camera.

Additionally, the method according to another embodiment is a method executed by a processor that executes a computer-readable command. The processor executes the command to (i) acquire information related to a transparent object generated in a virtual space between a subject and a camera and (ii) set the transparent object, using the information related to the transparent object.

The terminal device according to an embodiment is executed by a processor that executes a computer-readable command to (i) move a position of at least one gift by a transparent object in a virtual space between a subject and the camera that images the subject, and (ii) due to the position of the gift being moved, increase a display area of the subject imaged by the camera.

The terminal device according to an embodiment is executed by a processor that executes a computer-readable command to (i) acquire information related to a position of a subject in a virtual space, (ii) acquire information related to a position of a camera that images the subject, and (iii) generate a transparent object in the virtual space between the subject and the camera.

The terminal device according to an embodiment is executed by a processor that executes a computer-readable command to (i) acquire information related to a transparent object generated in a virtual space between a subject and a camera, and (ii) set the transparent object, using the information related to the transparent object.

BRIEF DESCRIPTION OF THE DRAWINGS

FIG. 4 is an example of data in the system according to an embodiment.

FIG. 5 is an example of data in the system according to an embodiment.

DETAILED DESCRIPTION OF EMBODIMENTS

Hereinafter, various embodiments will be described with reference to the attached drawings. It should be noted that for convenience in explaining, structural elements represented in a drawing(s) may be omitted in another drawing. Furthermore, it should be also noted that although the attached drawings disclose an embodiment of this application, they are not necessarily described on an exact scale. Additionally, in this application, subject matter indicated by the term "application" may be called software or a program, and may be a command to a computer and may be combined so as to obtain a result.

1. EXAMPLE OF SYSTEM

Figure 1:
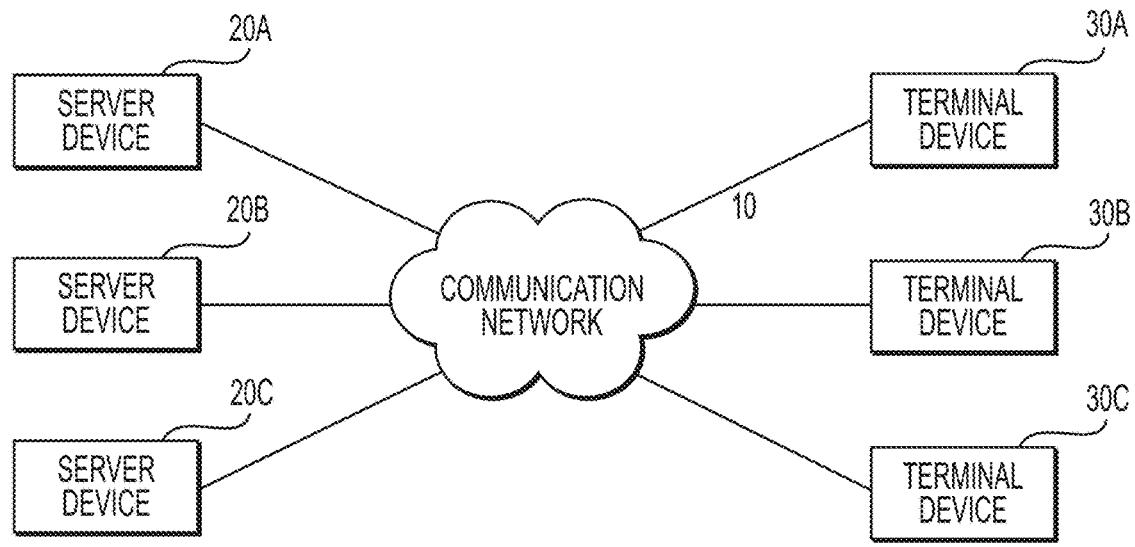
FIG. 1 is a block diagram showing an example of a configuration of a system according to an embodiment.

FIG. 1 is a block diagram showing an example of a configuration of a system according to an embodiment. As shown in FIG. 1, a system 1 may include (i) one or a plurality of server devices 20 connected to a communication network 10 and (ii) one or a plurality of terminal devices 30 connected to the communication network 10. In FIG. 1, three server devices 20A to 20C are exemplified as an example of the server device 20, and three terminal devices 30A to 30C are exemplified as an example of the terminal device 30. As a server device 20, one or a plurality of server devices 20 other than these may be connected to the communication network 10. Further, as a terminal device 30, one or a plurality of terminal devices 30 other than these may be connected to the communication network 10. In this application, the term "system" may be used to indicate both a server(s) and a terminal device(s), a server(s) only, or a terminal device(s) only. That is, the system may include any of the following aspects: a server(s) only, a terminal device(s) only, and both a server(s) and a terminal device(s).

Further, the system may be an information processor on the cloud. Further, the system may constitute a virtual information processor and may be logically configured as one information processor. Also, an owner of the system may be different from an administrator of the system.

The communication network 10 may be, but is not limited to, a mobile phone network, a wireless LAN, a fixed telephone network, the Internet, an intranet, Ethernet (registered trademark), and/or a combination thereof. In the communication network 10, various data disclosed in this application may be communicated The server device 20 may be able to perform an operation such as executing an installed predetermined application, whereby (i) a position of at least one gift is moved by a transparent object in a virtual space between a subject and a camera that images the subject and (ii) due to the position of the gift being moved, a display area of the subject that is imaged by the camera is increased.

Alternatively, the terminal device 30 may be able to perform an operation such as executing an installed web browser or a predetermined application, whereby (i) a position of at least one gift is moved by a transparent object in a virtual space between a subject and a camera that images the subject and (ii) due to the position of the gift being moved, a display area of the subject that is imaged by the camera is increased.

The terminal device 30 is any terminal device that can perform such an operation, and may be, but is not limited to, a smartphone, a tablet, a mobile phone (feature phone), and/or a personal computer.

2. HARDWARE CONFIGURATION OF EACH DEVICE

Next, an example of a hardware configuration of the server device(s) 20 will be described.

2-1. Hardware Configuration of Server Device 20

Figure 2:
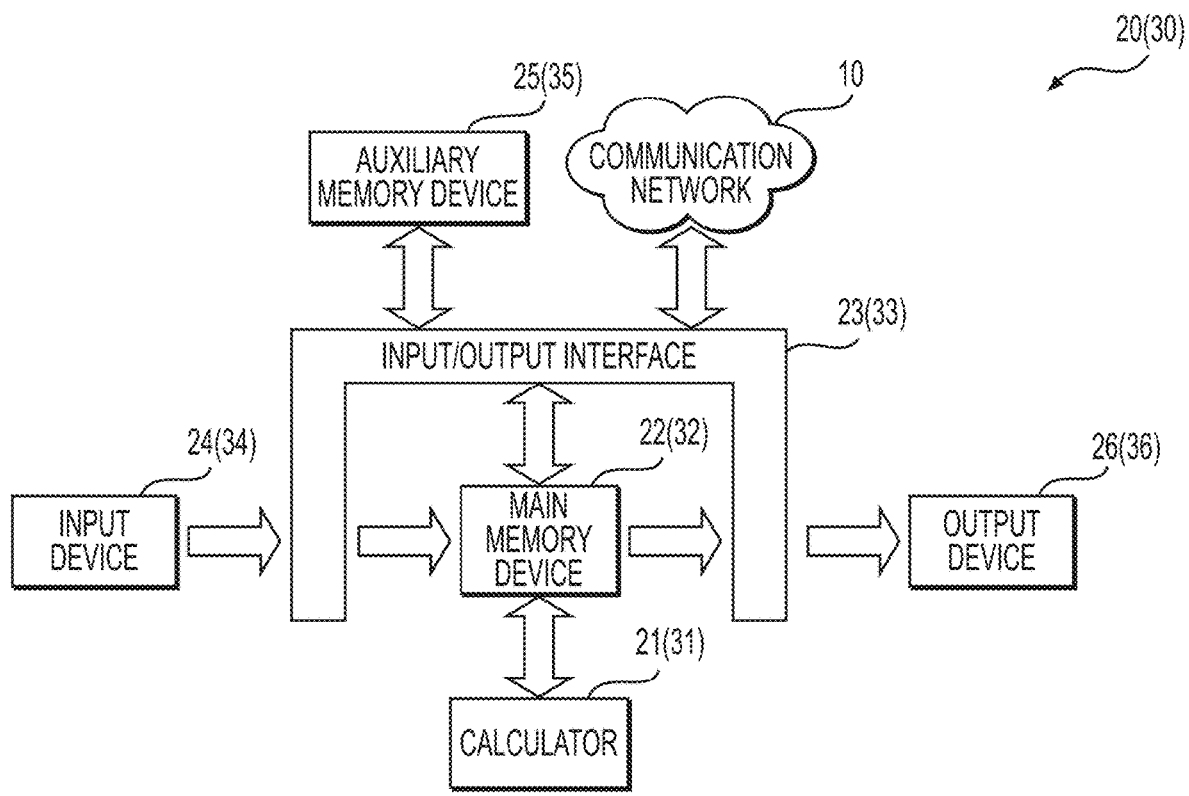
FIG. 2 is a block diagram schematically showing an example of a hardware configuration of the server device 20 (terminal device 30) shown in FIG. 1.

An example of the hardware configuration of the server device(s) 20 will be described with reference to FIG. 2. FIG. 2 is a block diagram schematically showing an example of the hardware configuration of the server device(s) 20 (terminal device(s) 30) shown in FIG. 1. (In FIG. 2, reference numerals in parentheses are those described in relation to the terminal device(s) 30 as described later.)

As shown in FIG. 2, the server device(s) 20 can mainly include a calculator 21, a main memory device 22, and an input/output interface device 23. The server device(s) 20 can further include an input device 24 and an auxiliary output device 26. These devices may be connected to each other by a data bus and/or a control bus.

The calculator 21 performs a calculation using a command and data stored in the main memory device 22, and stores a result of the calculation in the main memory device 22. Furthermore, the calculator 21 can control the input device 24, an auxiliary memory device 25, the output device 26, and the like via the input/output interface device 23. The server device(s) 20 may include one or a plurality of calculators 21. The calculator 21 may include one or a plurality of central processing devices (CPUs), microprocessors, and/or graphics processing units (GPUs).

The main memory device 22 has a memory function, and stores a command and data received from the input device 24, the auxiliary memory device 25, the communication network 10 and the like (server device 20 and the like) via the input/output interface device 23, and the calculation result of the calculator 21. The main memory device 22 may include, but is not limited to, a RAM (random access memory), a ROM (read-only memory) and/or flash memory.

The auxiliary memory device 25 is a memory device. Commands and data (computer program) constituting the above-described predetermined application, web browser, or the like may be stored thereon. By being controlled by the calculator 21, the auxiliary memory device 25 can load the commands and data (computer program) into the main memory device 22 via the input/output interface device 23. The auxiliary memory device 25 may be, but is not limited to, a magnetic disk device and/or an optical disk device, a file server, or the like.

The input device 24 is a device that takes in data from the outside, and may be a touch panel, a button, a keyboard, a mouse and/or a sensor, or the like.

The output device 26 may include, but is not limited to, a display device, a touch panel, and/or a printer device, or the like. Further, the input device 24 and the output device 26 may be integrated.

In such a hardware configuration, the calculator 21 may sequentially load, into the main memory device 22, the commands and data (computer program) that constitute a predetermined application stored in the auxiliary memory device 25, and calculate the loaded commands and data, whereby the calculator 21 controls the output device 26 via the input/output interface device 23, or sends/receives various information to and from other devices (for example, the server device 20 and other terminal device(s) 30, and the like) via the input/output interface device 23 and the communication network 10.

By having such a configuration and executing a predetermined installed application, the server device(s) 20 may execute part or all of an operation or the like as defined below (including various operations described in detail later) in which (i) a position of at least one gift is moved by a transparent object in a virtual space between a subject and a camera that images the subject, and (ii) due to the position of the gift being moved, a display area of the subject imaged by the camera is increased. In addition, such an operation or the like may be performed by a user giving an instruction to a system that is an example of the embodiments disclosed in this application by using the input device 24, or an input device 34 of the terminal device 30 described later. When the program is executed on the calculator 21, it may be displayed by the output device 26 of the server device 20 as a system used by the user, or may be configured to display on an output device 36 of the terminal device 30 as a system used by the user.

2-2. Hardware Configuration of Terminal Device 30

A hardware configuration example of the terminal device(s) 30 will be described with reference to FIG. 2 used above. As a hardware configuration of each terminal device 30, for example, the same hardware configuration as that of each server device 20 described above can be used. Therefore, reference numerals for the structural elements of each terminal device 30 are shown in parentheses in FIG. 2.

As shown in FIG. 2, each terminal device 30 may mainly include a calculator 31, a main memory device 32, an input/output interface device 33, an input device 34, an auxiliary memory device 35, and the output device 36. These devices are connected to each other by a data bus and/or a control bus.

The calculator 31, the main memory device 32, the input/output interface device 33, the input device 34, the auxiliary memory device 35, and the output device 36 are included in each of the terminal devices 30 described above, respectively, and may be substantially the same as or different from the calculator 21, the main memory device 22, the input/output interface device 23, the input device 24, the auxiliary memory device 25, and the output device 26 described above. Further, capacities and capabilities of the calculators and the memory devices may be different from above. In particular, the input device 34 and the output device 36 will be described in detail below.

In such a hardware configuration, the calculator 31 may sequentially load, into the main memory device 32, the commands and data (computer program) that constitute a predetermined application stored in the auxiliary memory device 35, and calculate the loaded commands and data, whereby the calculator 31 controls the output device 36 via the input/output interface device 33, or sends/receives various information to and from other devices (for example, each of the server devices 20 or the like) via the input/output interface device 33 and the communication network 10.

By having such a configuration, the terminal device(s) 30 may execute part or all of an operation or the like (including various operations described in detail later) in which (i) a position of at least one gift is moved by a transparent object in a virtual space between a subject and a camera that images the subject, and (ii) due to the position of the gift being moved, a display area of the subject imaged by the camera is increased. Further, by executing an installed web browser, a web page can be received and displayed from the server device 20 to execute the same operation. In addition, such an operation or the like may be performed by a user giving an instruction to a system that is an example of the embodiments disclosed in this application by using the input device 34. Also, when the program is executed on the calculator 31, it may be configured to display on the output device 36 of the terminal device 30 as a system used by the user.

In this application, as a terminal device, there may be two types of terminal devices: a "distributor terminal" and a "viewer terminal." These may be names given to the role of the terminal, and one terminal device may be a viewer terminal or a distributor terminal, or may be a viewer terminal and simultaneously a distributor terminal. The distributor terminal may be a terminal used by a distributor who appears as a subject, such as an avatar, in what is distributed. Meanwhile, the viewer terminal may be a terminal mainly used by a viewer who is a viewer of what is being distributed. In addition, the viewer may also exert a certain influence upon on what is distributed by a gifting action that provides a gift to a subject such as an avatar so that the gift appears in the delivered content. Similarly, the viewer may exert a certain influence upon what is delivered in the form of sound, comments, or the like. The delivered content may be a movie or an animation, and a subject such as an avatar played by the distributor may appear in part of the movie or animation. The above description is merely an example in which an embodiment of this disclosure is applied, and each embodiment of the disclosure of this application may be applied even in a virtual space in which a subject without such a premise appears.

As described above, the viewer terminal may be configured to be capable of sound input, comment input, gifting, and the like. For example, a user terminal may have a keyboard, a touch panel, or the like, as an input device 34, which can input a comment and acquire a comment that is text information. Further, the user terminal may have a function of generating a certain comment by the input device 34. These acquired comments may be similarly transmitted to the communication network 10 via the input/output interface device 23.

A comment according to the embodiments of this application may be automatically generated by the system, in addition to the comment(s) input by the user terminal. Such a comment may be transmitted to the user terminal and displayed on the user terminal.

Further, the user terminal may include a microphone that can acquire sound as the input device 34. Human voice may be acquired by a microphone as an input device 34 and treated as sound, or after being acquired by the microphone as the input device 34, it may be converted into text by voice recognition by the calculator 31 and used as a comment. The user terminal may generate sound by the calculator 31. The acquired sound or comment may be similarly transmitted to the communication network 10 via the input/output interface device 23.

Meanwhile, as the input device 34, the distributor terminal may include a motion sensor that can detect movement of a person. The motion sensor may be attached to a body of the distributor and may have a function that can detect movement of each part of the body. Each part of the body may include various parts such as the head, face, upper arms, forearms, hands, thighs, lower legs, feet, trunk, and the like, but is not limited to part or all of them. The motion sensor may be mounted in a position that can detect the movement of the body. The motion sensor may include an acceleration sensor, a gyro sensor, a geomagnetic sensor, or the like. The acquired information may be similarly transmitted to the communication network 10 via the input/output interface device 23.

Also, as the input device 34, the distributor terminal may include a camera capable of capturing a moving image as the input device 34. The camera may image the distributor's head, face, eyes, body part, whole body, or the like. When the camera images the head or face, it may be possible to detect the direction of the face. When the camera images the face, it may be possible to detect the facial expression. When the camera images the eyes, it may be possible to detect the line of sight. When the camera images a part or all of the whole body, it may be possible to detect the movement of the body together with or in place of the motion sensor described above. The information acquired about the face direction, the line of sight, the facial expression, and the movement of the body based on the imaged information may be similarly transmitted to the communication network 10 via the input/output interface device 23.

Further, the output device 36 in the viewer terminal and the distributor terminal may be a display device or a sound generator. The display device may be various devices as long as it has a function of being able to display, and examples thereof include a liquid crystal display, a plasma display, an organic EL display, a micro LED display, and a head-mounted display; but the display device is not limited to these, and various devices may be used. The sound generator may be a speaker, a headphone, an earphone, or the like. Information output by the output device 36 may be information generated by the calculator 31 or may be information received from the communication network 10.

3. FUNCTION OF EACH DEVICE

Figure 3:
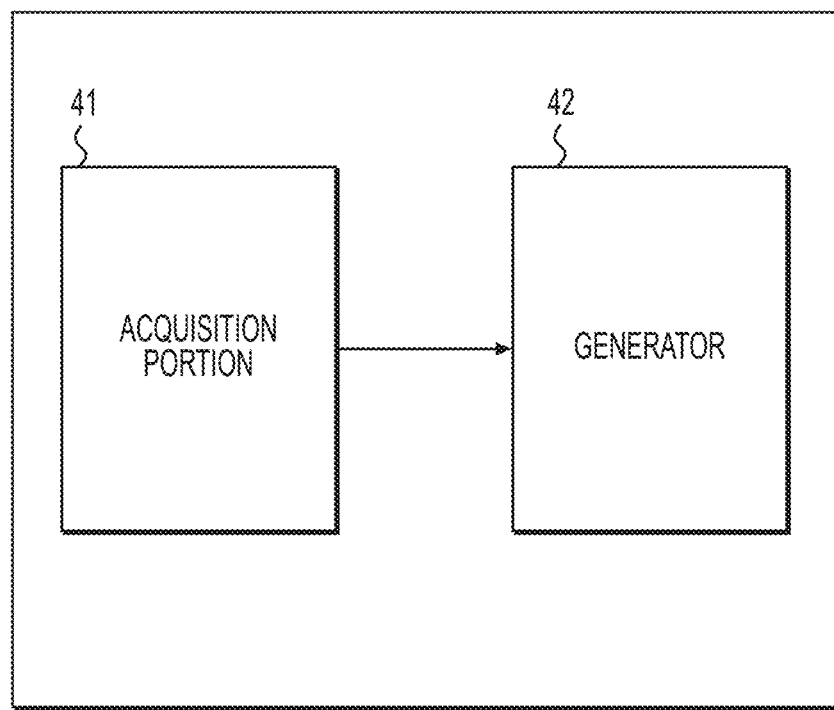
FIG. 3 is a block diagram schematically showing an example of the functions of a system according to an embodiment.

Next, an example of functions of each of the server devices 20 and each of the terminal devices 30 will be described with reference to FIG. 3. FIG. 3 is a block diagram schematically showing an example of the functions of the system shown in FIG. 1. As shown in FIG. 3, an example system may have an acquisition portion that acquires information that can be used to generate an object, and a generator that generates an object using the acquired information.

3.1. Acquisition Portion

The acquisition portion 41 acquires information that can be used to generate an object. The information that can be used to generate an object may include information relating to an object in a virtual space. The object may be a subject, a camera, a gift, or the like. In this application, the term "subject" refers to a high-level concept such as an avatar object controlled by the distributor, a character played by the distributor, a virtual creature subject to being imaged by an imaging device in a virtual space, or a game player.

The information relating to the object in the virtual space may be used to identify a position of the object to be generated, or may be used to determine a condition under which the object is generated.

The information relating to the subject may be any information used to display the subject in the virtual space, and may be position information of each part of the subject, a polygon constituting an appearance of the subject, or the like. Each part of the subject may be information about the subject's face, hands, body, feet, accessory, or the like.

Further, the information relating to the subject may be other information in place of or together with information acquired in real time from the above-mentioned distributor terminal. For example, it may be information acquired in advance from the distributor terminal, information generated in the server device, or information stored in the server device. As the information acquired in advance from the distributor terminal, for example, an example is conceived in which a motion capture regarding the movement of the distributor for a scene in which the distributor sings a song is pre-recorded and is acquired in advance from the distributor terminal, and the distributor reproduces the scene of singing the song in a song program using the motion capture stored in advance, while capturing an image in real time. Such reproduced motion capture may be used as information relating to the subject. Further, as the information generated in the server device and the information stored in the server device, for example, the information of a motion capture automatically generated by a computer can be mentioned, and the information of the automatically generated motion capture may be used as information relating to the subject.

The information relating to the gift may be any information used to display the gift in the virtual space, and may be position information of each part of the gift, a polygon constituting an appearance of the gift, or the like. The position information of each part of the gift may include information showing an outline of an outer shape of the gift. By using the information including the outline of the gift, there is an advantage that it can be determined whether the subject is hidden when the camera images the subject.

The information relating to the camera may include a position of the camera, a shooting direction of the camera, a size and a center of the camera when the camera has a predetermined size, or the like.

The position of the subject and the position of the camera may be used to determine the position of the generated object, the size of the object, and the shape of the object, and may be information that can be used to determine these.

There may be one each, or a plurality of each, of objects such as a subject, a gift, and a camera. In this case, the acquisition portion may acquire information relating to each of the one or more objects as appropriate.

In addition, position information relating to objects such as a subject, a camera, a gift, and the like may be predetermined by coordinate information. The coordinate information may be absolute coordinates or relative coordinates. In addition, various coordinate systems may be applied to the coordinate information. For example, a rectangular coordinate system, a spherical coordinate system, a polar coordinate system, a social coordinate system, a plane orthogonal coordinate system, or the like may be adopted. That is, any coordinate system that can specify a position in a virtual space is acceptable.

FIG. 4 is an example of the information acquired by the acquisition portion.

Shape

The information that can be used to generate an object may include information that identifies the shape of the object (sometimes referred to as "shape information relating to an object" in this application). The types of object shapes are listed below as a pyramid, a right pyramid, an oblique pyramid, an n-sided pyramid, and a cone, but they are not limited to these, and may be a polyhedron such as a rectangular parallelepiped or a cube. It may be a quadric surface such as a cylinder, and in short, may be various shapes generated for the purpose of moving the position of the gift in the virtual space between the subject and the camera depending on the solid.

Size

The information that can be used to generate an object may include information that identifies the size of the object (sometimes referred to as "size information relating to the object" in this application). The size of the object may be of various shapes intended to move the position of the gift in the virtual space. The size of the object may be shorter, in a direction of a linear distance between the subject and the camera, than the distance between the subject and the camera.

Generation Instruction

The information that can be used to generate an object may include information of an instruction to generate an object (sometimes referred to as "object generation instruction information" in this application). Such object generation instruction information has a function of triggering generation of an object.

FIG. 5 is another example of information acquired by the acquisition portion.

The acquisition portion may acquire information that can be used to generate the above-mentioned object in various embodiments. For example, the acquisition portion may acquire information from hardware in an information processor having the function of the acquisition portion, or may acquire information from another information processor. Here, the information processor may be, for example, a distributor terminal, a viewer terminal, a server, or the like.

Further, the acquisition portion may be caused to function in the same information processor as the information processor having the following generator, or may function in a different information processor. For example, the server device 20 may include the acquisition portion (as, for example, a function of the calculator 21), the terminal device 30 may include the acquisition portion (as, for example, a function of the calculator 31), or both the server device 20 and the terminal device 30 may include the acquisition portion. At the same time, the generator described below may be provided to the server device 20 (as, for example, a function of the calculator 21), the terminal device 30 (as, for example, a function of the calculator 31), or both.

3.2. Generator

The generator 42 has a function of generating an object. The generator may generate an object by using the information acquired by the acquisition portion that can be used to generate the object.

The generator may determine a position at which to generate an object by using the position relating to the object. For example, using the information relating to the position of a subject in a virtual space acquired by the acquisition portion and the information relating to the position of the camera that images the subject, the generator may generate a transparent object in the virtual space between the subject and the camera.

Further, the generator may generate an object by using the positional relationship between the subject and the camera. The generator may calculate a position at which to generate the object by using the information related to the position of the subject and the information related to the position of the camera. For example, the generator may determine the size and shape of the object so as to be between respective positions of the subject and the camera, and generate the object. The generator may change the position of the generated object after the object is generated.

Further, the generator may position the object at a position including a line segment of a line from a center of a field of view of the camera to a center of a face of the subject. The position including the line segment may be a position that positions the object so that the line segment is included inside the object. Further, the generator may position the object at a position where the object overlaps with the line segment of the line from the center of the field of view of the camera to the center of the face of the subject. Overlapping with a line segment may refer to a state in which the object and the line segment occupy the same position in space. With these configurations, the object is between the camera and a head of the subject. By generating such an object, the line segment or a gift in a vicinity of the line segment will be moved. If the object is transparent, the movement of the gift will reduce the number of things in a space between the camera and the subject, so it will be easier for the camera to image the subject.

When there is a plurality of subjects, the generator may generate an object between each subject and the camera. In this case as well, as described above, the generator may determine the position of the objects from the positions of the plurality of subjects and the position of the camera. More specifically, the generator may determine the positions of the objects between the plurality of subjects and the camera, and compose each object. This has an advantage that the position of the gift is moved so that each subject of the camera can be easily displayed even when there is a plurality of subjects.

Shape

The generator may determine the shape of the object, based on the shape information of the object acquired by the acquisition portion, or based on a predetermined shape.

For example, in the generator, as the shape of the object, regarding the length of a line perpendicular to a straight line from the center of the camera to the center of the face of the subject, the length on the subject side may be shorter than the length on the camera side. In this case, while a large number of gifts on the camera side are moved, gifts on the subject side are more difficult to move than those on the camera side, so there is an advantage that the subject can be seen while maintaining a state in which the subject is buried in the gifts and is a popular subject who has received a large number of gifts.

In addition, the generator may generate the shape of the object as a pyramid. Here, the apex of the pyramid may be on the subject side, and a bottom surface in a direction opposite to the apex of the pyramid may be on the camera side. Even in this case, while a large number of gifts on the camera side are moved, gifts on the subject side are more difficult to move than on those the camera side, so there is an advantage that the subject can be seen while maintaining a state in which the subject is buried in the gifts and is a popular subject who has received a large number of gifts. The pyramid may be a right pyramid or an oblique pyramid.

Further, the generator may generate the shape of the object as an n-pyramid or a cone. n in the n-pyramid may be any arbitrary natural number. Further, the generator may generate the shape of the object as a frustum. In this case, since there is no apex of the pyramid, there is an advantage that a certain gift(s) can be moved even on the subject side.

By using the determined shape, the generator may generate an object having such a shape.

Size

The generator may determine the size of the object by using the size information relating to the object acquired by the acquisition portion, or may determine the size of the object by using a predetermined size. The larger the object is, the more the gifts between the subject and the camera are moved, and the number of gifts between the subject and the camera is reduced, which allows the camera to display a larger area of the subject, but the atmosphere of the subject having been given a large number of gifts is reduced. Meanwhile, when the object is small, the gifts between the subject and the camera are less likely to be moved as compared with the above, and the volume occupied by the gifts between the subject and the camera increases. Thus, a range in which the camera can display the area of the subject is smaller than that described above, but there is an advantage that the camera can display the subject while maintaining the atmosphere of the subject having been given a large number of gifts.

Additionally, the generator may determine the size of the object by using the position related to the object. For example, when the object has a length in a direction of a line segment connecting the subject and the camera, the generator may determine the length, on the line segment connecting the subject and the camera, in terms of the size of the object, based on the positional relationship between the subject and the camera, depending on the length of the distance between the subject and the camera. For example, it may be an object having the same length as the distance between the subject and the camera in the direction of the line segment connecting the subject and the camera, or it may be an object having a length of a predetermined ratio of the distance in the direction of the line segment connecting the subject and the camera. Here, the distance between the subject and the camera may be various distances between the position related to the subject and the position related to the camera. For example, the position related to the subject may be the center of the display area of the subject, the center of the face of the subject, the position of the neck of the subject, the position of the eyes of the subject, the center of gravity of the display area of the subject, or the like. Additionally, the position related to the camera may be the center of the field of view of the camera, the center of gravity of the field of view of the camera, a predetermined position related to the camera, or the like.

In addition, with respect to the generator, when the object has a length in a direction perpendicular to the direction of the line segment connecting the subject and the camera, in terms of the size of the object, various lengths are acceptable for a length in the direction perpendicular to the distance between the subject and the camera. The length may be, for example, a predetermined length, a length of a predetermined ratio with respect to the above-mentioned distance between the subject and the camera, or a length of a predetermined ratio with respect to (i) a length of the field of view of the camera or (ii) a length obtained by multiplying the length of the field of view of the camera by the angle of view of the field of view of the camera.

The generator may use the determined size to generate an object having such a size. Further, the generator may generate an object smaller than the determined size, and may perform a process of significantly changing the size of the object up to the determined size. In either case, using conventional technology of controlling the position of the object in the virtual space, part of the generated object and part of the gift(a) occupy the same virtual space. When a collision is detected, the position of the gift(s) that has collided with the object may be moved, based on a predetermined law of mechanics in the virtual space.

Generation Timing

The generator may generate an object, based on an instruction to generate the object acquired by the acquisition portion. For example, the generator may generate an object by acquiring information including an instruction to generate the object.

Further, the generator may generate an instruction to generate an object when a predetermined condition is satisfied, and the generator may generate an object, based on the instruction for generation.

The predetermined condition may be determined using the position related to the object.

The predetermined condition may include a case in which part or all of the imaging area in which the subject is imaged by the camera overlaps with the imaging area in which the at least one gift is imaged by the camera. In such a case, for example, part of the subject imaged by the camera may be hidden by the gift(s). In such a case, an instruction to generate an object is generated so as to move the gift(s) and make it easier for the camera to image the subject.

Further, the predetermined condition may include a case in which an area of a predetermined ratio or more of the imaging area in which the subject is imaged by the camera overlaps with the imaging area in which at least one gift is imaged by the camera. In such a case, for example, part of the subject that is being imaged by the camera may be hidden by a gift(s) at a predetermined ratio or more. This provides an advantage that a degree to which the subject is hidden by the gift(s) can be specified by a ratio such that (i) when the subject is slightly hidden by the gift(s), it will be shown that the subject is so popular that it can be hidden by the gift(s), so the subject will be left as-is, and (ii) only when the subject is significantly hidden, that is, a range in which the subject is imaged is a predetermined ratio or more, an instruction to generate an object is generated so as to move the gift(s) and make it easier for the camera to image the subject.

Here, the imaging area of the subject to be imaged may include an accessory of the subject. An accessory of the subject may be an item, clothes, and the like of the subject. Since it may be better that the accessory of the subject is not hidden by the gift(s), there is an advantage that these imaging areas can also be used for determination.

Further, the predetermined condition may include a case in which part or all of a predetermined portion of the subject overlaps with the area of at least one gift. In such a case, for example, the face of the subject imaged by the camera may be hidden by a gift. That is, a predetermined portion of the subject may be (i) the eyes, (ii) eyes and nose, (ii) eyes, nose, and mouth, (iv) face, (v) face and neck, (vi) upper body, or the like of the subject. These predetermined portions of the subject may be portions that are particularly needed to identify who the subject is, or may be portions that affect the expression of the subject. In that case, if the subject is hidden by the gift, it will affect the identification and expressiveness of the subject, so it is better to move the position of the gift.

With the above-mentioned configuration, when part or all of a predetermined portion of the subject is hidden by the gift, even if it is hidden to a small extent, there is an advantage that an instruction to generate an object can be generated so as to move the gift and make it easier for the camera to image the subject.

In addition, the predetermined condition may include a case in which part or all of the area of the subject is hidden by the at least one gift. In this case, there is an advantage that the object is generated on condition that the subject is hidden by the given gift, the gift is moved, and the subject becomes visible.

Further, the predetermined condition may exclude a case in which the distance between the subject and the camera is shorter than a predetermined distance. In this case, if the distance between the subject and the camera is short, there is no possibility that a gift exists, and there is no reason to generate object generation instruction information.

Static Movement of Object

The generator may determine a motion of the object by using static information of an object acquired by the acquisition portion, or may determine the motion of the object by using static information of a predetermined object. The static information may be stationary information or motion-related information. Motion-related information may include only a predetermined motion, or may include the predetermined motion and parameters related to the predetermined motion. The predetermined motion may be, for example, moving the entire object in a horizontal direction in the imaging of the camera, a vertical direction in the imaging of the camera, an expansion/contraction direction in the direction of a line segment connecting the subject and the camera, and/or in a circular direction in an imaging state of the camera, or may be moving part of the object in the horizontal direction in the imaging of the camera, the vertical direction in the imaging of the camera, the expansion/contraction direction in the direction of the line segment connecting the subject and the camera, and/or in the circular direction in an imaging state of the camera. Part of the object may be, for example, an edge of the object on the subject side or on the camera side. Further, the movement may be linked to the movement of the camera. In this case, when the imaging direction of the camera is moved in the horizontal direction in the imaging of the camera, the vertical direction in the imaging of the camera, the expansion/contraction direction in the direction of the line segment connecting the subject and the camera, and/or the circular direction in the imaging state of the camera, according to the imaging direction, the object including an extension line of the imaging direction may be operated in the horizontal direction in the imaging of the camera, the vertical direction in the imaging of the camera, the expansion/contraction direction in the direction of the line segment connecting the subject and the camera, and/or the circular direction in the imaging state of the camera. In this case, there is an advantage that with the camera, a user can image a state as if the gift(s) were being dug away.

The generator may generate the above-mentioned object as a transparent object.

The object generated by the generator may be set so that the position generated in the virtual space can be maintained with priority over the gift(s). Maintenance with priority may be set such that when another gift is positioned in the same position as the space in which the object has been generated, the object can occupy the virtual space in preference to the other gifts. With such a priority setting, a gift that occupies the same space as the space occupied by the object cannot exist in the same space due to the generation of the object, and can be moved. For the movement of the gift itself, conventional technology relating to collision and space movement of objects in a virtual space may be applied.

Figure 6:
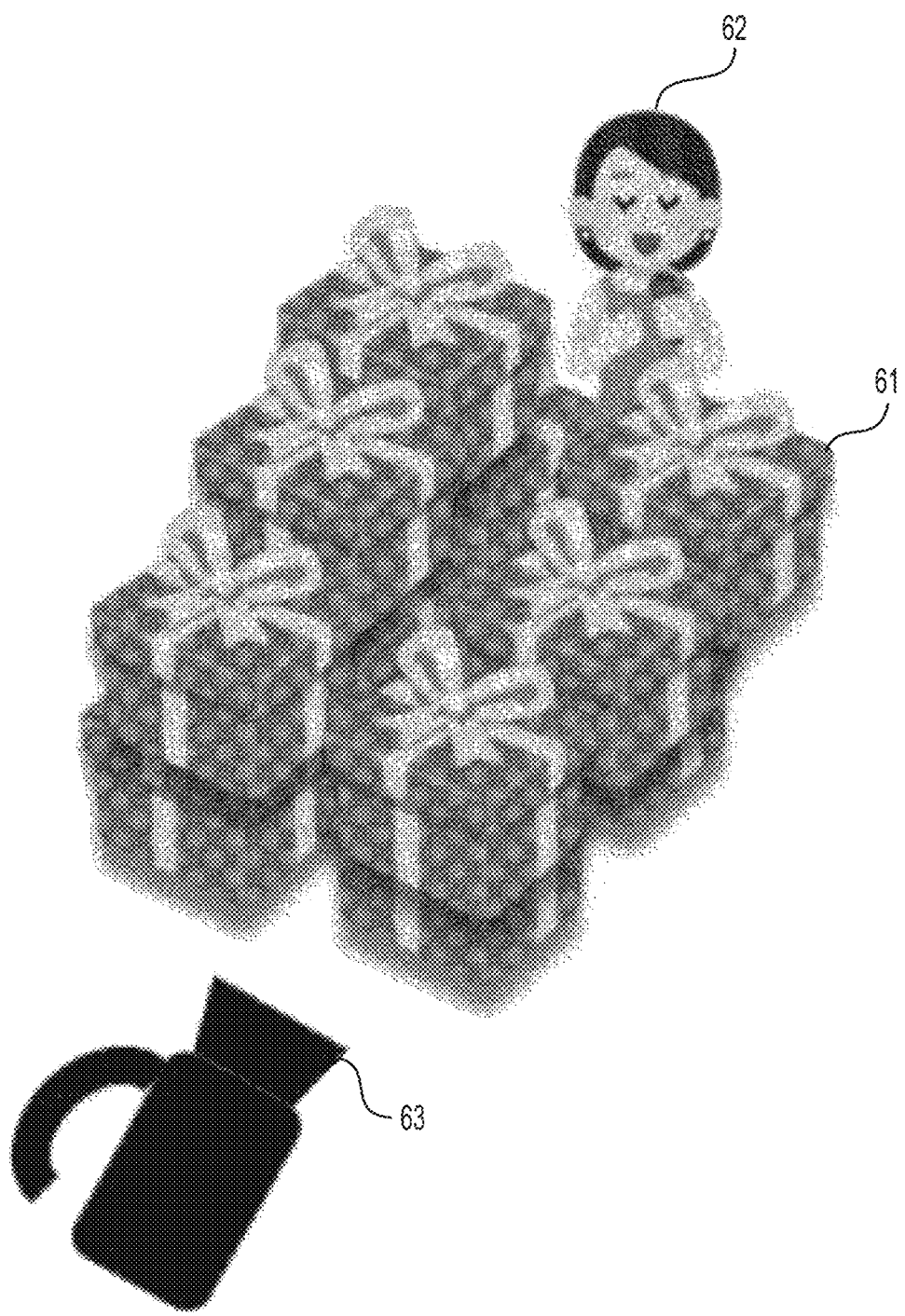
FIG. 6 is a diagram showing an example of a problem in conventional technology of a system according to an embodiment.
Figure 7:
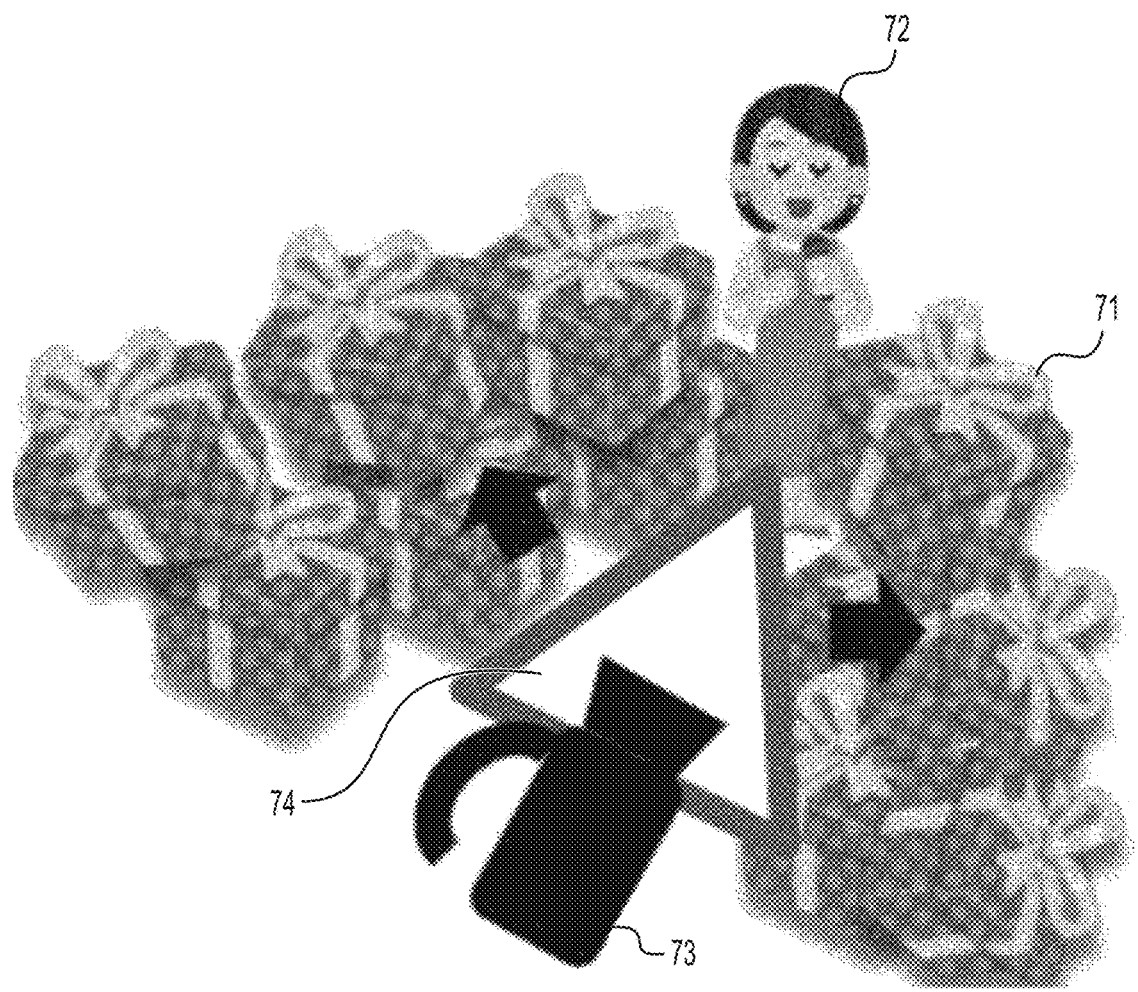
FIG. 7 is a diagram showing an example of an effect of a system according to an embodiment.

Further, since the generator can generate a transparent object, in an embodiment of this disclosure, the position of at least one gift may be moved by the transparent object in the virtual space between the subject and the camera that images the subject, and due to the position of the gift being moved, a display area of the subject imaged by the camera is increased. Conventionally, the premise has often been that the processing when the subject cannot be seen due to the object between the subject and the camera is to place the object in a non-display state or a translucent state, because these objects are in the way. However, if the object between the subject and the camera is a gift, the gift is a result of a viewer's interaction with the subject and should be respected. For example, FIG. 6 shows a state in which a subject 62 is difficult to be recognized by the camera 63 due to a plurality of gifts 61. These gifts are important gifts given to the subject by a viewer and should not be treated lightly. Therefore, it is preferable not to treat these gifts as an obstacle, but to faithfully move the positions of the gifts slightly. Thus, for example, as shown in FIG. 7, gifts 71 between a subject 72 and a camera 73 may be moved by an object 74 generated between the camera 73 and the subject 72. At this time, as indicated by arrows of the camera 73, according to the movement of the camera, the object 74 may move so as to express a situation in which the camera pushes through a large number of gifts. There is also an advantage that in this way, an act of moving or pushing through the gifts itself indicates that a large amount of gifts have been given to the subject, which is an expression indicating that the subject is a popular person.

As described above, an embodiment according to this disclosure may be one in which the object moves the position of at least one gift in a virtual space between the subject and the camera, and may be one in which due to the position of the gift being moved, a display area of the subject imaged by the camera is increased.

Furthermore, as described above, in an embodiment of the disclosure of this application, a relationship may be used such that the gift(s) is moved by the presence of the generated transparent object, taking into account that the gift is a movable object and that it is an important thing that the viewer has provided to the subject.

4. EMBODIMENTS

4-1. First Embodiment

Figure 8:
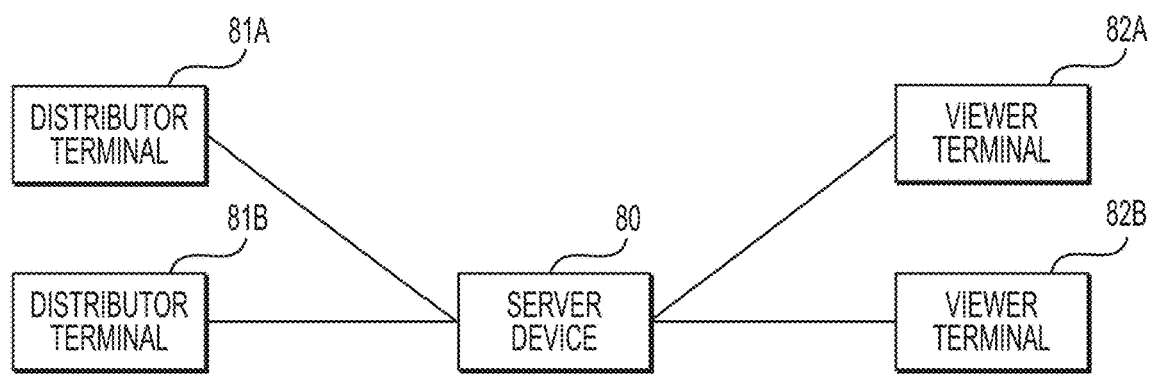
FIG. 8 is a block diagram showing an example of a configuration of a system according to an embodiment.
Figure 9:
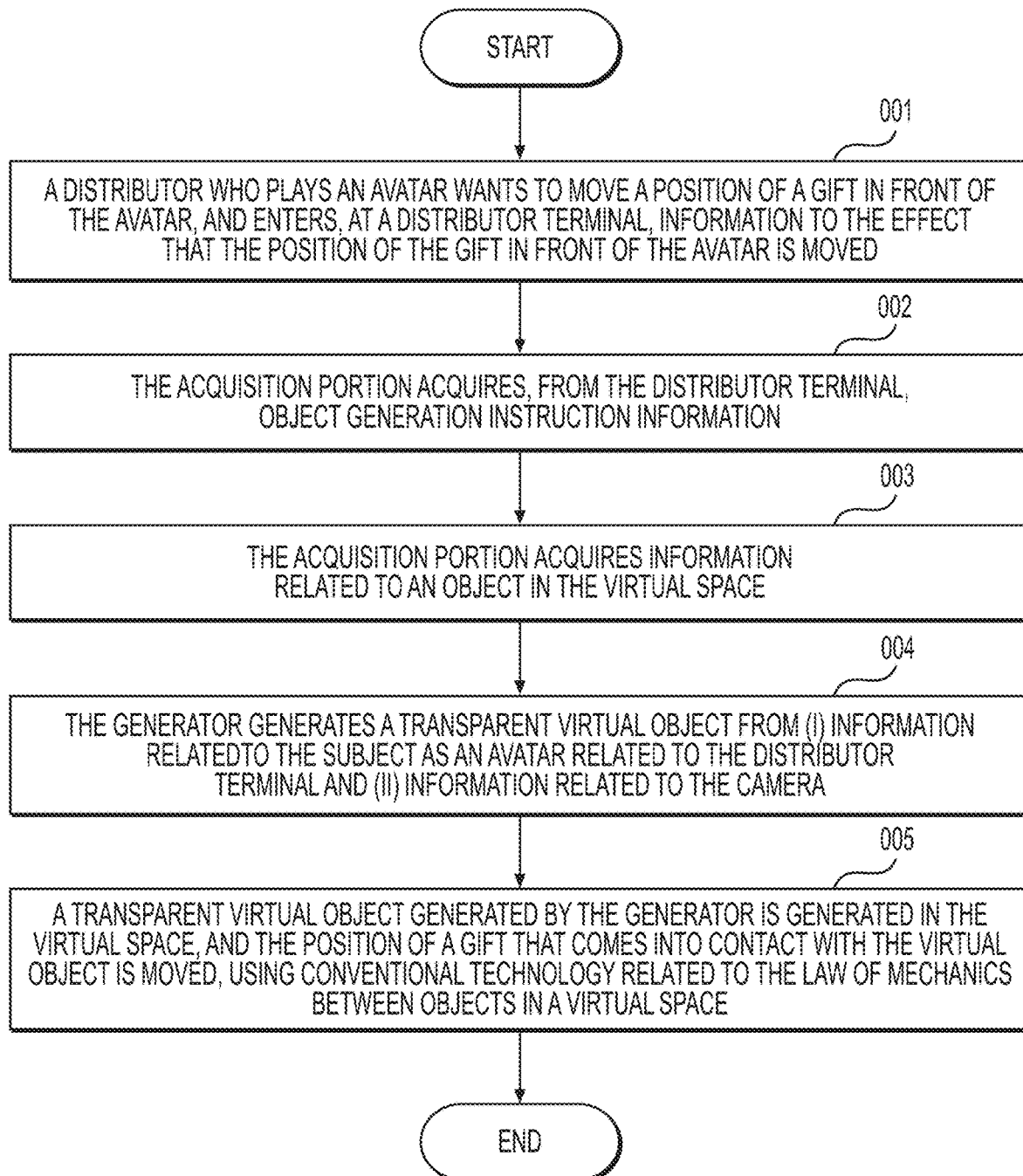
FIG. 9 is an example of a flow processed by a system according to an embodiment.

The first embodiment is an embodiment in which an object is generated in a distributor terminal. As a premise of an example of this embodiment, an avatar played by a distributor at a distributor terminal has appeared in the virtual space, a gift is provided by a viewer for the avatar, and the avatar is difficult to recognize from a camera. This state is a state in which the avatar is covered by the gift that has been provided by the viewer. In the following, for clarity, not only a processing at a computer system side, but also behavior of a person will be described as a premise. In this embodiment, in the entire system including (i) a distributor terminal 81A and a distributor terminal 81B, (ii) a server device 80, and (iii) a viewer terminal 82A and a viewer terminal 82B as shown in FIG. 8, an operation is mainly processed by the distributor terminal 81A. Hereinafter, a flow of this embodiment will be described with reference to FIG. 9.

Step 1

The distributor who plays the avatar wants to move the position of a gift in front of the avatar, and inputs, at the distributor terminal, information to the effect that the position of the gift in front of the avatar is moved (Step 001).

Step 2

The acquisition portion acquires, from the distributor terminal, object generation instruction information (Step 002).

Step 3

The acquisition portion acquires information related to the object in the virtual space (Step 003). In particular, it acquires (i) information related to the subject as an avatar related to the distributor terminal that has acquired the object generation instruction information and (ii) information related to the camera.

Step 4

The generator generates a transparent object (see, for example, the object 74 in FIG. 7) from (i) the information related to the subject as an avatar related to the distributor terminal and (ii) the information related to the camera (Step 004). Here, the shape of the object may be various as described above, and the shape may be arbitrarily determined, but here, it is assumed that the shape is given in advance. Further, the size of the object is determined by using (i) the information related to the subject, (ii) the information related to the camera, and (iii) predetermined information that has been determined in advance. Additionally, the position at which the object is generated is also determined as described above.

Step 5

A transparent object generated by the generator is generated in the virtual space, and the position of the gift(s) that comes into contact with the object is moved, using conventional technology related to the law of mechanics between objects in a virtual space (Step 005).

In the above-described embodiment, the object generation instruction information is based on an input at the distributor terminal, but may be automatically generated, based on the position of the object in the virtual space.

Further, (i) the object generated at the distributor terminal may be generated in a virtual space at the distributor terminal, (ii) information related to the generated object (information usually needed to display an object in a virtual space, for example, the position, size, shape, polygon, and the like of the object) may be sent to the server so as to generate an object in the virtual space and move the position of the gift, or (iii) the information related to the generated object may be sent to a viewer terminal to generate an object in the virtual space at the viewer terminal and move the position of the gift. For example, at the distributor terminal, information related to a transparent object generated in the virtual space between the subject and the camera may be acquired, and the transparent object may be set using the information related to the transparent object.

4-2. Second Embodiment

Figure 10:
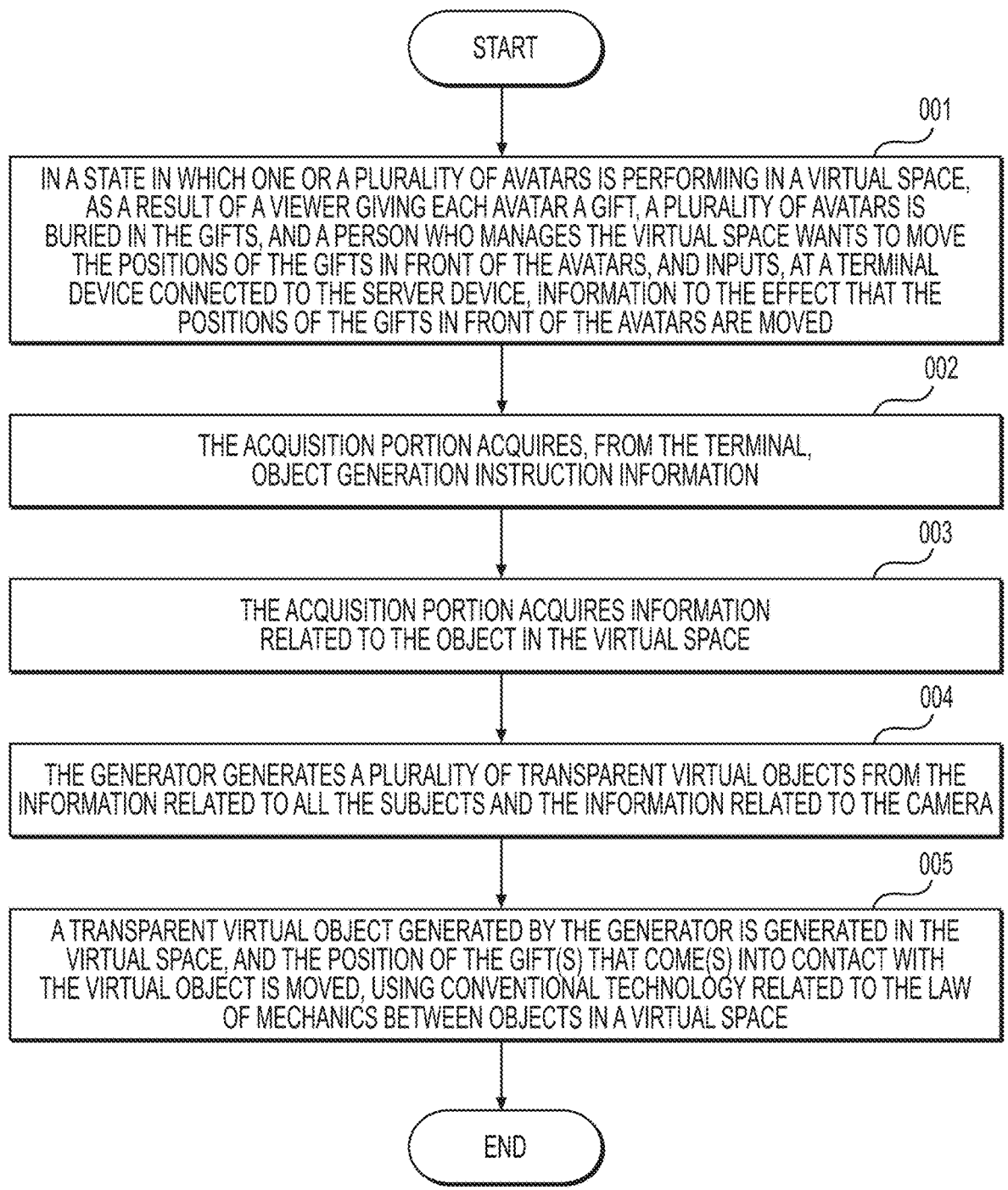
FIG. 10 is an example of a flow processed by a system according to an embodiment.

The second embodiment is an embodiment in which an object is generated in the server. In this embodiment, for example, a situation is provided in which, when one or a plurality of distributors performs in a studio, an object is generated by a person who manages a performance status of the studio to move a gift and manage a degree of recognition of a subject. Specifically, in FIG. 8, a person who manages the virtual space uses the server device 80 or a terminal device (not depicted) connected to the server device 80 to input an object generation instruction. In this embodiment, an example will be described in which an object is generated for all avatars in the virtual space. A flow of this embodiment will be described with reference to FIG. 10.

Step 1

In a state in which one or a plurality of avatars is performing in a virtual space, as a result of a viewer giving each avatar a gift, a plurality of avatars is buried in the gifts, and the person who manages the virtual space wants to move the positions of the gifts in front of the avatars, and inputs, at a terminal device connected to the server device, information to the effect that the positions of the gifts in front of the avatars are moved (Step 001).

Step 2

The acquisition portion acquires, from the terminal, the object generation instruction information (Step 002).

Step 3

The acquisition portion acquires information related to the object in the virtual space (Step 003). In particular, information related to the subjects related to all the avatars in the virtual space and information related to the camera is acquired.

Step 4

The generator generates a plurality of transparent objects from the information related to all the subjects and the information related to the camera (Step 004). The shape and size of the objects may be the same as in the first embodiment, but the plurality of transparent objects may be set to a size and shape so as not to collide with each other, or the plurality of transparent objects may be integrated and made into one transparent object.

Step 5

The transparent object(s) generated by the generator is generated in the virtual space, and the position of a gift(s) that comes into contact with the object is moved, using conventional technology of the law of mechanics between objects in a virtual space (Step 005).

As described above, an object generated in the above-mentioned server device may be generated in the server device to move a gift, or information related to the generated object (information usually needed to display, in a virtual space, an object, for example, the position, size, shape, polygon, and the like of the object) may be sent to a viewer terminal or a distributor terminal to generate an object in the virtual space in the viewer terminal or the distributor terminal, and then to move the position of a gift(s).

Further, in this embodiment, objects are generated between the subjects related to all avatars in the virtual space and the camera, but an object may be generated between the subjects related to some avatars in the virtual space and the camera.

Additionally, in the above-described embodiment, the object generation instruction information is based on input in a terminal by an administrator. However, in this embodiment as well, it may be automatically generated, based on the position of the object in the virtual space.

4-3. Third Embodiment

The third embodiment is an embodiment in which an object is generated at a viewer terminal. In this embodiment, for example, in a situation in which distribution is performed from one or a plurality of distributor terminals, considering that a gift(s) exists in front of a subject related to an avatar and that it is difficult for the viewer to recognize the subject, the viewer wants to move the position of the gift(s) in front of the subject, and an object generation instruction is input.

Figure 11:
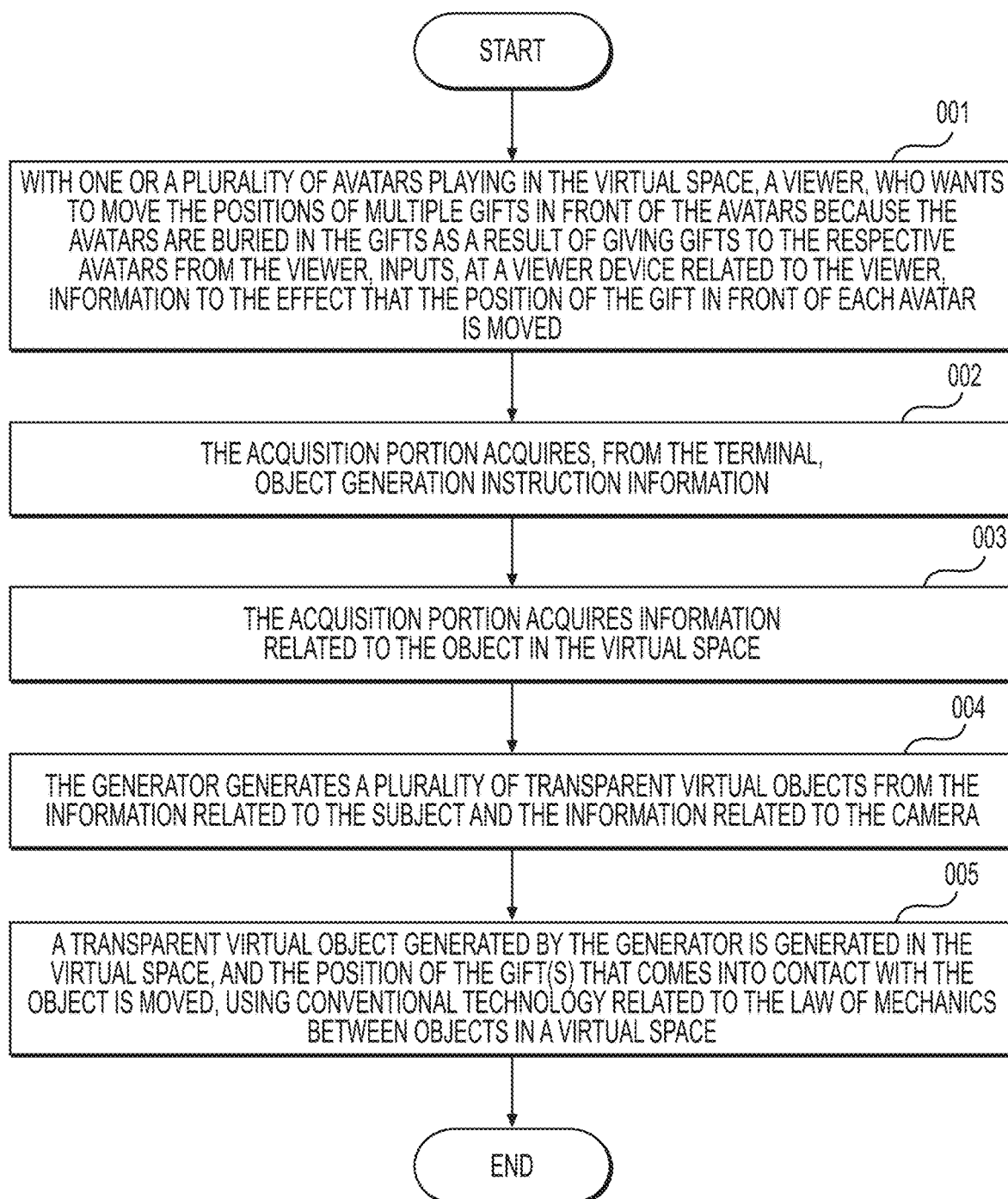
FIG. 11 is an example of a flow processed by a system according to an embodiment.

Specifically, in FIG. 8, an object generation instruction is input from the viewer terminal 82A or 82B. In this case, the object generation instruction may be one object generation instruction, which can simultaneously generate objects for moving gifts for all the subjects from among subjects related to avatars played by one or a plurality of distributors in a virtual space, or may be an object generation instruction, which can generate an object(s) for moving a gift(s) for part of all the subjects. In the latter case, it may be configured such that one or a plurality of subjects can be selected to indicate which subject(s) pertains to the object generation instruction. A flow of this embodiment will be described with reference to FIG. 11.

Step 1

In a state in which one or a plurality of avatars is performing in a virtual space, as a result of a viewer giving each avatar gifts, a plurality of avatars is buried in the gifts, a viewer, who wants to move the positions of gifts in front of the avatars, inputs, at a viewer device related to the viewer, information to the effect that the positions of the gifts in front of each avatar is moved (Step 001). Here, if it is an object generation instruction for all subjects, one object generation instruction may be input, but when one or a plurality of subjects for which the gift is desired to be moved is selected as part of the subjects, information that designates such one or a plurality subjects may be input.

Step 2

The acquisition portion acquires, from the terminal, object generation instruction information (Step 002).

Step 3

The acquisition portion acquires information related to the object in the virtual space (Step 003). Here, as described above, if an object generation instruction is given for all the subjects, information related to all the subjects in the virtual space and information related to the camera may be acquired. If one or a plurality of subjects is selected for which the gift is desired to be moved, the structure may be such that the information related to such one or a plurality of subjects and the information related to the camera can be acquired.

Step 4

The generator generates a plurality of transparent objects from the information related to the subjects and the information related to the camera (Step 004). As described above, depending on whether the subject for which the gift is moved is all or some of the subjects, a corresponding one or more transparent objects may be generated.

Step 5

A transparent object generated by the generator is generated in the virtual space, and the position of the gift(s) that comes into contact with the object is moved, using conventional technology of the law of mechanics between objects in a virtual space (Step 005).

As described above, the object generated in the abovementioned viewer terminal may be generated only in the viewer terminal so as to move the gift. Such information may or may not be communicated to another viewer terminal. When communicated, there is an advantage that a user can understand when and for which subject another viewer has generated an object and has moved the gift. Meanwhile, if each viewer wants to move the gift at a desired timing, each viewer may input an object generation instruction at a desired timing to move the gift. In this case, images displayed on the respective viewer terminals are different from each other. A certain subject may not be buried in the gift(s) at one viewer terminal, but such a subject may be buried in the gift(s) at another viewing terminal.

Further, in the above-described embodiment, the object generation instruction information is based on an input at the viewer terminal, but in this embodiment as well, it may be automatically generated, based on the position of the object in the virtual space.

In the above description, the object, the subject, the gift, and the camera are all in the virtual space; thus, they may include concepts of a virtual object, a virtual subject, a virtual gift, and a virtual camera, respectively.

In addition, the system and information processing described in this application may be implemented by software, hardware or a combination thereof. Part or all of such a system and information processing implements processing and procedures as a computer program and may be executed by various computers. These computer programs may be stored in a memory medium. Additionally, these programs may be stored on a non-transient or temporary memory medium.

The disclosure of this application is not limited to the embodiments described above. Needless to say, this disclosure can be applied to various examples within the scope of various technical concepts having various technical advantages and configurations described in this application.

EXPLANATION OF SYMBOLS

1 System
10 Communication network
20 (20A-20C) Server devices
30 (30A-30C) Terminal devices
21 (31) Calculator
22 (32) Main memory device
23 (33) Input/output interface
24 (34) Input device
25 (35) Auxiliary memory device
26 (36) Output device
41 Acquisition portion
42 Generator
61, 71 Gifts
62, 72 Subjects
63, 73 Cameras
80 Server
81A, 81B Distributor terminals
82A, 82B Viewer terminals

What is claimed is:

1. A system comprising one or more processors programmed to:
   display a transparent object in a virtual space; and
   cause the transparent object to move a position of at least one gift in the virtual space between a virtual subject and a virtual camera that images the virtual subject, wherein
   based on the position of the at least one gift being moved, a display area of the virtual subject imaged by the virtual camera is increased in the virtual space, and
   a size of the transparent object displayed in the virtual space is determined using information related to the position of the virtual subject and information related to the position of the virtual camera.

2. The system according to claim 1, wherein
   a position in the virtual space at which to generate the transparent object is calculated, using the information related to the position of the virtual subject and the information related to the position of the virtual camera.

3. The system according to claim 1, wherein
the transparent object is placed at a position on a line segment of a line extending from a center of a field of view of the virtual camera to a center of a face of the virtual subject.

4. The system according to claim 1, wherein
the transparent object is placed at a position where the transparent object overlaps with a line segment of a line extending from a center of a field of view of the virtual camera to a center of a face of the virtual subject.

5. The system according to claim 1, wherein
the transparent object is generated by acquiring information including an instruction for object generation.

6. The system according to claim 1, wherein
the transparent object is generated when part or all of an imaging area in which the virtual subject is imaged by the virtual camera overlaps with an imaging area in which the at least one gift is imaged by the virtual camera.

7. The system according to claim 1, wherein
the transparent object is generated when an area of a predetermined ratio or more of an imaging area in which the virtual subject is imaged by the virtual camera overlaps with an imaging area in which the at least one gift is imaged by the virtual camera.

8. The system according to claim 6, wherein
the imaging area of the virtual subject to be imaged includes an accessory of the virtual subject.

9. The system according to claim 1, wherein
the transparent object is generated when part or all of a predetermined location of the virtual subject overlaps with the area of the at least one gift.

10. The system according to claim 1, wherein
the transparent object is generated when part or all of an area of the virtual subject is hidden by the at least one gift.

11. The system according to claim 1, wherein
a line included as part of a shape of the transparent object is a line perpendicular to a straight line from a center of the virtual camera to a center of a face of the virtual subject, and
a length of the line on a subject side of the virtual subject is shorter than the length on a camera side of the virtual camera.

12. The system according to claim 1, wherein
a shape of the transparent object is a frustum.

13. The system according to claim 1, wherein
a shape of the transparent object is an n-sided pyramid or a cone.

14. The system according to claim 1, wherein
a shape of the transparent object is a pyramid.

15. A server device comprising:
a processor programmed to execute a computer-readable command to
display a transparent object in a virtual space, and
cause the transparent object to move a position of at least one gift in the virtual space between a virtual subject and a virtual camera that images the virtual subject, wherein
based on the position of the at least one gift being moved,
a display area of the virtual subject imaged by the virtual camera is increased in the virtual space, and
a size of the transparent object displayed in the virtual space is determined using information related to the position of the virtual subject and information related to the position of the virtual camera.

16. A method executed by a processor that executes a computer-readable command, wherein the method comprises:
displaying a transparent object in a virtual space; and
causing the transparent object to move a position of at least one gift in the virtual space between a virtual subject and a virtual camera that images the virtual subject, wherein
based on the position of the at least one gift being moved,
a display area of the virtual subject imaged by the virtual camera is increased in the virtual space, and
a size of the transparent object displayed in the virtual space is determined using information related to the position of the virtual subject and information related to the position of the virtual camera.

* * * * *